United States Patent
Xu et al.

(10) Patent No.: US 12,360,702 B2
(45) Date of Patent: Jul. 15, 2025

(54) PROGRAMMABLE CONTROL SYSTEM AND METHOD FOR SOLID STATE DRIVE

(71) Applicant: T-Head (Shanghai) Semiconductor Co., Ltd., Shanghai Free Trade Area (CN)

(72) Inventors: Yuming Xu, Chengdu (CN); Jiu Heng, Chengdu (CN); Fei Xue, Sunnyvale, CA (US); Wentao Wu, Shanghai (CN); Jifeng Wang, Chengdu (CN); Jiajing Jin, Hangzhou (CN); Xiang Gao, Shanghai (CN)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 0 days.

(21) Appl. No.: 18/174,333

(22) Filed: Feb. 24, 2023

(65) Prior Publication Data

US 2024/0143225 A1    May 2, 2024

(30) Foreign Application Priority Data

Nov. 2, 2022    (CN) .......................... 202211363324.2

(51) Int. Cl.
*G06F 3/06* (2006.01)
*G06F 13/28* (2006.01)

(52) U.S. Cl.
CPC .......... *G06F 3/0659* (2013.01); *G06F 3/0604* (2013.01); *G06F 3/0658* (2013.01);
(Continued)

(58) Field of Classification Search
None
See application file for complete search history.

(56) References Cited

U.S. PATENT DOCUMENTS

| 8,959,060 | B2 | 2/2015 | Carmichael |
| 9,189,309 | B1 | 11/2015 | Ma et al. |

(Continued)

FOREIGN PATENT DOCUMENTS

| CN | 113196226 A | 7/2021 |
| CN | 114077547 A | 2/2022 |
| CN | 114746834 A | 7/2022 |

OTHER PUBLICATIONS

Billy Tallis. "The Next Step in SSD Evolution: NVMe Zoned Namespaces Explained." Aug. 2020. AnandTech. https://www.anandtech.com/show/15959/nvme-zoned-namespaces-explained.*

(Continued)

*Primary Examiner* — Nathan Sadler
(74) *Attorney, Agent, or Firm* — Sheppard Mullin Richter & Hampton LLP

(57) ABSTRACT

A solid state drive (SSD) includes an NAND memory and an SSD controller. The SSD controller includes an interface coupled to a host machine, a nonvolatile memory controller coupled to the interface, and a processor coupled to the nonvolatile memory controller. The SSD controller is configured to: receive, via the interface, a write command from the host machine; process, by the nonvolatile memory controller, the write command; transmit, from the nonvolatile memory controller to the processor, a system message; process, by the processor according to Zoned Namespaces (ZNS) protocol, the system message; obtain, by the nonvolatile memory controller via the interface, host data for storage from the host machine; and write the host data to the NAND memory based on a result of processing the system message. Processing the system message by the processor and obtaining the host data by the nonvolatile memory controller are executed in parallel.

15 Claims, 5 Drawing Sheets

(52) U.S. Cl.
CPC ............ *G06F 3/0679* (2013.01); *G06F 13/28* (2013.01); *G06F 2213/0026* (2013.01)

(56) References Cited

U.S. PATENT DOCUMENTS

| | | | |
|---|---|---|---|
| 9,229,796 | B1 | 1/2016 | Ma et al. |
| 9,268,702 | B2 | 2/2016 | Bilas et al. |
| 10,223,016 | B2 | 3/2019 | Chen et al. |
| 10,552,038 | B2 | 2/2020 | Baldwin et al. |
| 10,891,055 | B2 | 1/2021 | Warfield et al. |
| 10,996,863 | B1 | 5/2021 | Kuzmin et al. |
| 11,100,008 | B2 | 8/2021 | Wilson et al. |
| 11,209,989 | B2 | 12/2021 | Bjørling et al. |
| 11,221,972 | B1* | 1/2022 | Raman .................... H04L 67/60 |
| 11,347,439 | B2 | 5/2022 | Kanjirathinkal et al. |
| 11,422,704 | B2 | 8/2022 | Adams et al. |
| 2011/0238625 | A1 | 9/2011 | Hamaguchi et al. |
| 2017/0104663 | A1 | 4/2017 | Thakur |
| 2018/0095911 | A1* | 4/2018 | Ballapuram ............ G06F 13/18 |
| 2018/0260347 | A1* | 9/2018 | Benisty ................ G06F 3/0688 |
| 2019/0235777 | A1 | 8/2019 | Wang et al. |
| 2020/0167274 | A1 | 5/2020 | Bahirat et al. |
| 2020/0348867 | A1 | 11/2020 | Chanler et al. |
| 2021/0019067 | A1 | 1/2021 | Miller et al. |
| 2021/0132827 | A1 | 5/2021 | Helmick et al. |
| 2021/0133098 | A1 | 5/2021 | Wilson et al. |
| 2021/0149796 | A1* | 5/2021 | Nam .................... G06F 13/1668 |
| 2021/0318801 | A1* | 10/2021 | Benisty ................ G06F 3/0604 |
| 2021/0334006 | A1 | 10/2021 | Singh et al. |
| 2021/0334203 | A1 | 10/2021 | Helmick et al. |
| 2021/0334215 | A1 | 10/2021 | Gole et al. |
| 2021/0349780 | A1 | 11/2021 | Ki et al. |
| 2021/0349781 | A1 | 11/2021 | Ki et al. |
| 2022/0012142 | A1 | 1/2022 | Ryu et al. |

OTHER PUBLICATIONS

NVM Express. "Technical Proposal ID 4053a—Zoned Namespaces." Apr. 2021. NVM Express.*

Qiu et al. "A High-Performance and Scalable NVMe Controller Featuring Hardware Acceleration." Apr. 2022. IEEE. IEEE Transactions on Computer-Aided Design of Integrated Circuits and Systems. vol. 41. pp. 1344-1357.*

First Office Action for Chinese Application No. 202211363324.2 mailed on Jun. 18, 2025, 15 pages.

* cited by examiner

PROGRAMMABLE CONTROL SYSTEM AND METHOD FOR SOLID STATE DRIVE

CROSS REFERENCE TO RELATED APPLICATION

This application claims priority to and benefits of Chinese patent Application No. 202211363324.2, filed with the China National Intellectual Property Administration (CNIPA) on Nov. 2, 2022. The entire contents of the above-identified application are incorporated herein by reference.

TECHNICAL FIELD

This disclosure is generally related to a solid state drive (SSD), and more specifically to programmable control systems and methods for SSD.

BACKGROUND

The solid-state drive is a storage device composed of one or more solid-state electronic storage chips. The SSD generally includes a controller and a storage semiconductor chip.

The design for enterprise-level standard SSDs generally relies on protocols such as the Peripheral Component Interconnect Express (PCIe) protocol and nonvolatile memory express (NVMe) protocol. Under these protocols, the host operates the SSD in the same way as the traditional HDD, where the characteristics of the SSD itself is invisible to the host. Therefore, the controller for the SSD needs to adapt to the characteristics of the storage medium to ensure data reliability. An essential difference between SSD and traditional hard disk drive (HDD) is that the SSD storage medium needs to be erased in blocks before it can be written. Due to the inconsistent characteristics of the data written by the host, a large number of holes/unused storage units are generated. The SSD controller needs to perform hole recovery, that is, garbage collection (GC), and the same data are repeatedly written. This leads to increased writes and erases in the SSD, resulting in a decreased device life.

Zoned Namespaces (ZNS) protocol has been proposed for use in SSDs. ZNS SSDs are different from the traditional SSDs. In ZNS SSDs, the physical information of the storage medium is open to the host. The host can write different types of data into different physical areas on the SSD, reducing GC actions to increase SSD life and reduce SSD power consumption.

SUMMARY

In one aspect, an SSD is provided. The SSD includes an NAND memory and an SSD controller. The SSD controller includes an interface coupled to a host machine, a nonvolatile memory controller coupled to the interface, and a processor coupled to the nonvolatile memory controller. The SSD controller is configured to: receive, via the interface, a write command from the host machine; process, by the nonvolatile memory controller, the write command; transmit, from the nonvolatile memory controller to the processor, a system message; process, by the processor according to Zoned Namespaces (ZNS) protocol, the system message; obtain, by the nonvolatile memory controller via the interface, host data for storage from the host machine; and write the host data to the NAND memory based on a result of processing the system message. Processing the system message by the processor and obtaining the host data by the nonvolatile memory controller are executed in parallel.

In some embodiments, the interface is operated according to Peripheral Component Interconnect Express (PCIe) protocol.

In some embodiments, the nonvolatile memory controller is operated according to nonvolatile memory express (NVMe) protocol.

In some embodiments, the nonvolatile memory controller includes a submission queue (SQ) block configured to determine an SQ identifier and initiates an operation to obtain submission queue entry (SQE) content by sending to the host machine a request for the SQE content.

In some embodiments, the nonvolatile memory controller includes a submission queue entry (SQE) block, and receives the SQE content to the SQE block. The system message transmitted from the nonvolatile memory controller to the processor includes the SQE content.

In some embodiments, the nonvolatile memory controller includes a complete queue (CQ) block and a merger block. The merger block is configured to send a CQ message to the CQ block after receiving both the result of processing the system message from the processor and the host data from the host machine.

In some embodiments, the CQ block is configured to, in response to receiving the CQ message from the merger block, send a complete queue entry (CQE) message to the host machine indicative of completion of the write command.

In some embodiments, the write command is a doorbell message.

In another aspect, an apparatus including a host machine and an SSD is provided. The SSD includes an NAND memory and an SSD controller. The SSD controller includes an interface coupled to a host machine, a nonvolatile memory controller coupled to the interface, and a processor coupled to the nonvolatile memory controller. The SSD controller is configured to: receive, via the interface, a write command from the host machine; process, by the nonvolatile memory controller, the write command; transmit, from the nonvolatile memory controller to the processor, a system message; process, by the processor according to Zoned Namespaces (ZNS) protocol, the system message; obtain, by the nonvolatile memory controller via the interface, host data for storage from the host machine; and write the host data to the NAND memory based on a result of processing the system message. Processing the system message by the processor and obtaining the host data by the nonvolatile memory controller are executed in parallel.

In yet another aspect, a method of operating an SSD is provided. The SSD includes an NAND memory and an SSD controller coupled to the NAND memory. The SSD controller includes an interface coupled to a host machine, a nonvolatile memory controller coupled to the interface, and a processor coupled to the nonvolatile memory controller. The method includes: receiving, via the interface, a write command from the host machine; processing, by the nonvolatile memory controller, the write command; transmitting, from the nonvolatile memory controller to the processor, a system message; processing, by the processor according to Zoned Namespaces (ZNS) protocol, the system message; obtaining, by the nonvolatile memory controller via the interface, host data for storage from the host machine; and writing, by the SSD controller, the host data to the NAND memory based on a result of processing the system message. Processing the system message by the processor according to the ZNS protocol and obtaining the host data by the nonvolatile memory controller from the host machine are executed in parallel.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

Figure 1:
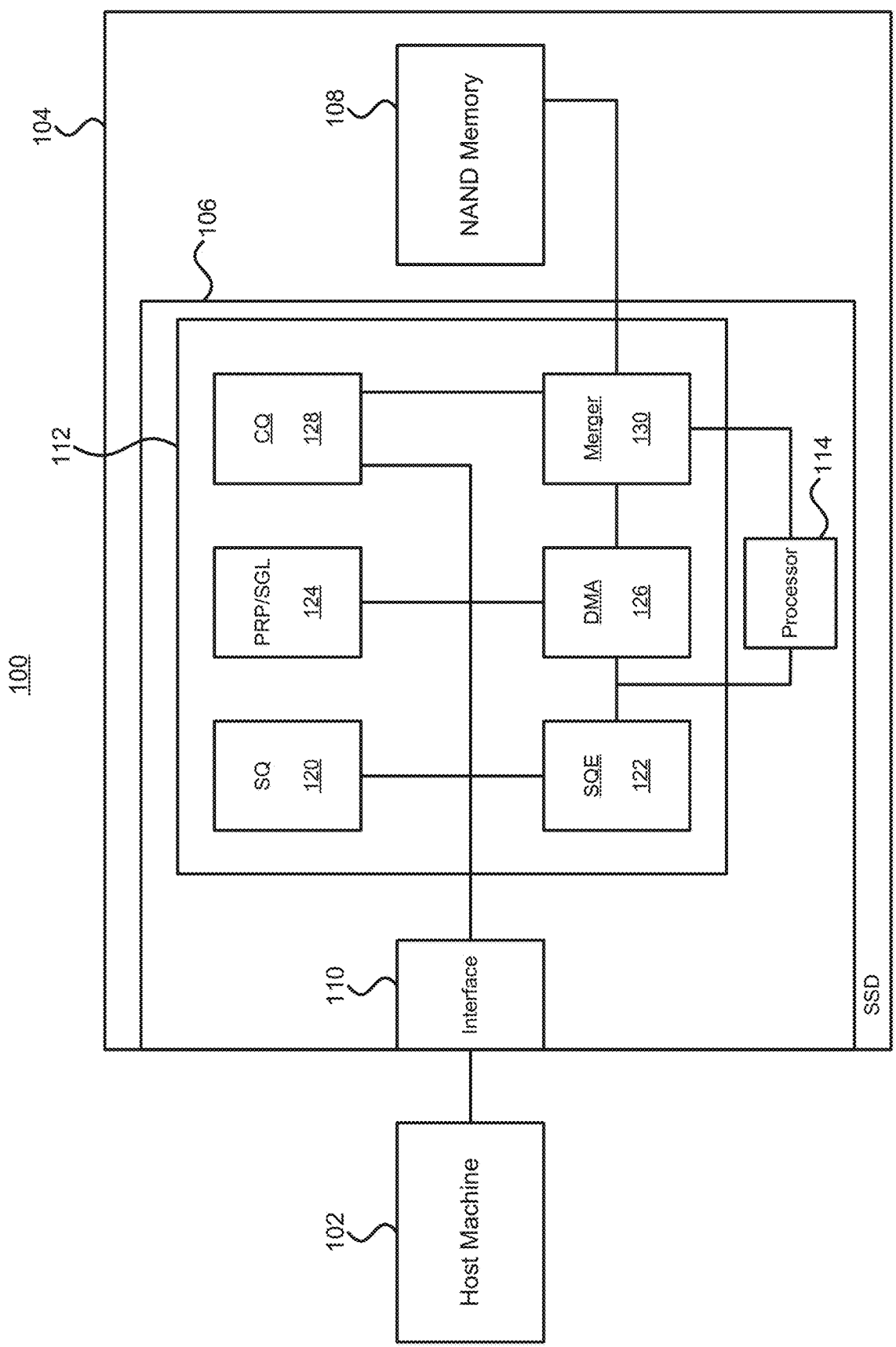
FIG. 1 is a block diagram depicting a system, according to one example embodiment.

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments are directed to techniques that can provide SSD controllers for programmable ZNS and other scalable protocols. In some embodiments, The SSD controllers may add the programmable ZNS and other scalable protocols onto the standards such as NVMe and PCIe protocols to provide flexible solutions to SSD technologies. The techniques disclosed herein can not only support programming upgrades and adapt to subsequent protocol upgrades, but also meet the same low-latency processing performance required by SSDs.

The ZNS protocol for SSDs can be implemented in software techniques. In this implementation, the PCIe protocol can be implemented with hardware in processing, and the analog and digital intellectual property (IP) solutions. The NVMe protocol is completely implemented by software processed by a central processing unit (CPU). After the PCIe module is processed, the data is sent directly to the CPU. The CPU completes NVMe protocol processing; including submission queue (SQ) scheduling, submission queue entry (SQE) acquisition, Physical Region Page (PRP)/Scatter Gather List (SGL) acquisition, direct memory access (DMA), ZNS extension protocol, complete queue (CQ) information upload and interruption, etc. The solution provides flexibility to adapt to changes in ZNS and NVMe protocols because the protocols are executed by software, which is conducive to later expansion. However, because the processing efficiency of the CPU is not as high as that of hardware, the performance, latency, and power consumption are hard to be well balanced.

In some instances, the ZNS protocol for SSDs can be implemented as hardware solutions. Similar to the software implementation, the PCIe protocol can be implemented with hardware in processing, and the analog and digital intellectual property (IP) solutions. NVMe and ZNS protocols are also implemented by specialized hardware. This solution can achieve the good performance, and less latency and power consumption. The fixed hardware cannot be upgraded accordingly such that the legacy SSDs may not enjoy the latest advancements.

The techniques disclosed herein provide balanced solutions to implement ZNS and other protocols in SSDs. In some embodiments, the techniques provides a ZNS SSD controller implemented in a combination of software and hardware to support the balance of performance, latency, and power consumption. In some embodiments, the NVMe protocol is implemented by hardware, and the ZNS protocol is processed by software and executed by a processor, e.g., an embedded processor in the SSD controller.

Reference is first made to FIG. 1. FIG. 1 is a block diagram depicting a system 100, according to one example embodiment. For example, the system may be any computer system, such as a server tower, a server deck, a server, a desktop, a laptop, a notebook computer, a tablet, a smart phone, etc. The system 100 includes a host machine 102 and an SSD 104. The host machine may include one or more microprocessors and one or more host buffers/memories. The SSD 104 includes an SSD controller 106 and an NAND memory 108. The SSD controller 106 includes an interface 110, a nonvolatile memory controller 112 coupled to the interface 110, and a processor 114 coupled to the nonvolatile memory controller 112. The nonvolatile memory controller 112 includes functional blocks such as an SQ block 120, an SQE block 122, a PRP/SGL block 124, a DMA block 126, a CQ/CQE (submission queue entry) block 128, and a merger block 130.

In some embodiments, the interface 110 can be implemented in compliance with the PCIe protocol and includes hardware for processing analog transmission and digital protocols. In some embodiments, the nonvolatile memory controller 112 may be implemented in compliance with the NVMe protocol. The processor 114 may be an embedded CPU configured to perform various computation tasks for the SSD controller 106, including, for example, execute software instructions for the ZNS protocol.

In some embodiments, the SQ block 120 is configured to process SQ-related configuration registers and SQ scheduling modules in the NVMe protocol. The SQE block 122 is configured to handle obtaining SQE-related information from the host machine 102. The PRP/SGL block 124 is configured to process protocol requirements such as PRP/SGL linked list in the NVMe protocol. The DMA block 126 is configured to handle transmission tasks such as data acquisition from the host machine 102. The CQ/CQE block 128 is configured to process the CQ queue of NVMe protocol and related protocols, and send interrupts to the host machine 102. The merger block 130 is configured to process hardware module commands and CPU commands to merge modules, and feedback the status to the CQ block 128.

Figure 2:
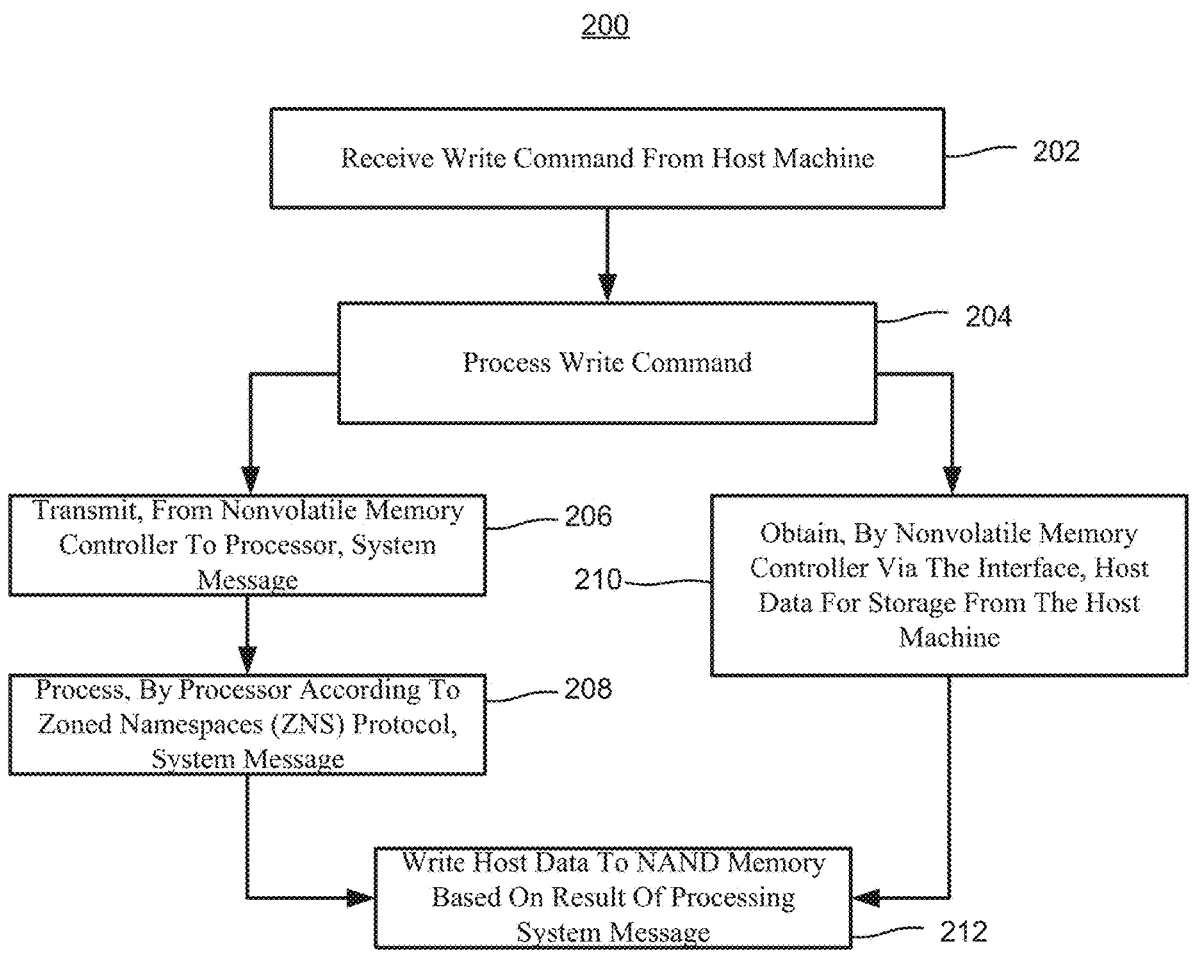
FIG. 2 is a flow chart illustrating a method for processing a write command at an SSD, according to one example embodiment.

Reference is now made to FIG. 2. FIG. 2 is a flow chart illustrating a method 200 for processing a write command at an SSD, according to one example embodiment. The SSD includes an NAND memory and an SSD controller. The method 200 may be performed by the SSD controller, e.g., the SSD controller 106 at FIG. 1. At 202, the SSD controller receives via an interface, a write command from a host machine. The interface may be operated according to the PCIe protocol. In some embodiments, the write command is initiated with a doorbell message under the applicable protocol, e.g., PCIe and NVMe protocols. At 204, the SSD controller processes the write command. For example, an SQ block (e.g., the SQ block 120 in FIG. 1) of the SSD controller may receive the doorbell message and determine an SQ identifier for acquire an SQE content by sending to the host machine a request for the SQE content. At 206, once an SQE block (e.g., the SQE block 122 in FIG. 1) of the SSD controller receives the SQE content from the host machine, the SQE block of the SSD controller sends a system message including the SQE content to a processor (e.g., the processor 114 in FIG. 1) of the SSD controller. At 208, the processor of the SSD controller process the system message according to the ZNS protocol.

At 210, the SSD controller obtains host data for storage from the host machine in parallel with operations 206 and 208. For example, the SQE block of the SSD controller may transmit the SQE content to a DMA block (e.g., the DMA block 126 in FIG. 1) of the SSD controller to enable the DMA block to obtain data for storage from the host machine. In some implementations, the DMA block of the SSD controller may invoke a PRP/SGL block (e.g., the PRP/SGL block 124 in FIG. 1) to perform address resolution for the data for storage. The result of the address resolution is then return to the DMA block to enable the DMA block to obtain the data from the host machine. At 212, the SSD controller writes the data for storage obtained from the host machine to the NAND memory based on the processing result from operation 208.

In the techniques disclosed herein, the ZNS protocol-related processes are performed by the processor in parallel with obtaining the data for storage from the host machine. These techniques reduced the wait time to save the data into the NAND memory, thereby improving write efficiency of the SSD. Moreover, the more matured protocols, such as PCIe and NVMe protocols are implemented by hardware, it provides a robust performance in the write operation, The less matured protocols, such as the ZNS protocol, are implemented with software executed by the processor. Because updates to the ZNS protocol can easily be implemented with software updates, the SSD system may be modified through the software updates to adapt to the latest protocol to enjoy technology advancements.

Figure 3:
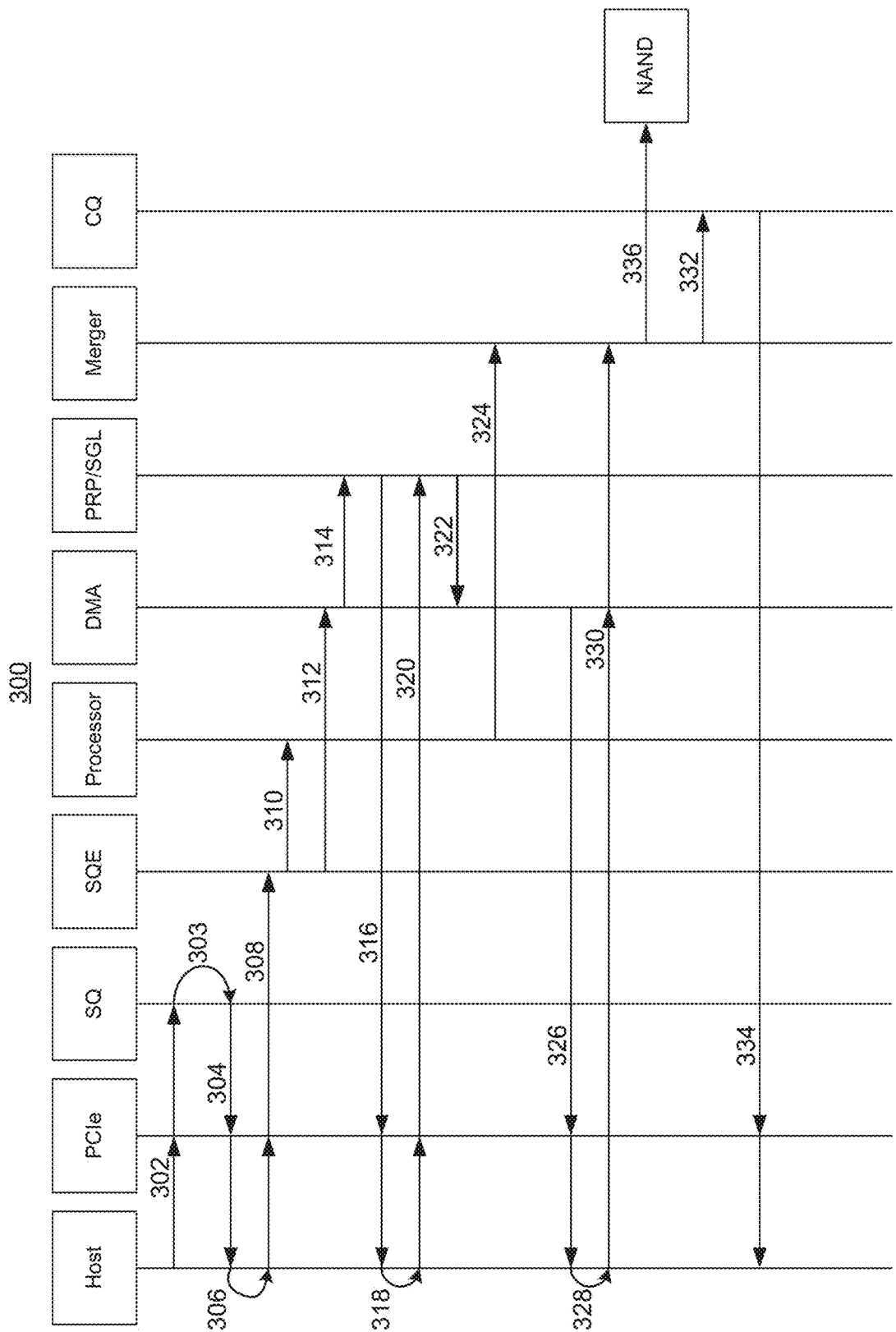
FIG. 3 is a ladder diagram illustrating a method for processing a write command at an SSD system/apparatus that includes a host machine and an SSD, according to one example embodiment.

FIG. 3 is a ladder diagram illustrating a method 300 for processing a write command at an SSD system/apparatus that includes a host machine and an SSD, according to one example embodiment. The SSD includes an NAND memory and an SSD controller. The method 300 may be performed at, for example, the SSD system of FIG. 1. At 302, the host machine sends a write command to the SQ block of the SSD controller via the PCIe interface. The write command may be a doorbell message. At 303, the SQ block determines an SQ identifier according to an applicable protocol (e.g., NVMe protocol) for acquiring SQE content. At 304, the SQ block sends a request for the SQE content to the host machine via the PCIe interface. At 306, the host machine gets the SQE content based on the request. At 308, the host machine sends the SQE content to the SQE block of the SSD controller. At 310, the SQE block reads the SQE content and sends a system message including the SQE content to the processor. Further, at 312 the SQE block sends the SQE content to the DMA block to enable the DMA block to obtain host data for storage from the host machine. In some embodiments, the SQE block may send the SQE content to the processor before, or after, or at the same time as it sends the SQE content to the DMA block to initiate parallel processing at the processor and the DMA block. At 314, the DMA block sends the PRP/SGL messages to the PRP/SGL block for the PRP/SGL block to perform address resolution to get the host data for storage. At 316, the PRP/SGL block performs address resolution with the host machine to identify the address(es) for the host data for storage. At 318, the host machine obtains the address(es) of the host data at the host buffer. At 320 the host machine returns the address(es) of the host data at the host buffer to the PRP/SGL block. At 322, the PRP/SGL block returns the address(es) of the host data to the DMA block to enable the DMA block to acquire the host data.

At 326, the DMA block initiates a request for the host data to the host machine based on the address(es) of the host data. At 328, the host machine obtains the host data based on the address(es) of the host data. At 330, the host machine sends the host data to the DMA block, which in turn sends the host data to the merger block.

Meanwhile, at 324 the processor sends to the merger block the result of processing the system message according to a protocol (e.g., ZNS protocol). At 332, in response to receiving both the result of processing the system message from the processor and the host data from the DMA block, the merger block sends a CQ message to the CQ block. At 334, in response to receiving the CQ message, the CQ block sends CQE message indicative of completion of the write command to the host machine via the PCIe interface. The host machine records the CQE message in its buffer. At 336, the merger block writes the host data to the NAND memory based on the result of processing the system message.

In the techniques disclosed herein, the operation 324 and operations 314, 316, 318, 320, 322, 326, 328, and 330 are executed in parallel. Once the results from those operations are both received at the merger block, the SSD control can indicate to the host machine that the write command is complete and that it is ready to receive the next command. Because of the parallel processing employed in the system, it provides efficient write operation according to an emerging protocol (e.g., the ZNS protocol) where the emerging protocol is implemented by software and executed by the processor and the matured protocol (e.g., PCIe and NVMe protocols) is implemented with hardware and/or firmware. The techniques provide flexibility for the SSD system to adapt to the latest protocol updates for the emerging protocol without changing its hardware structures.

Figure 4:
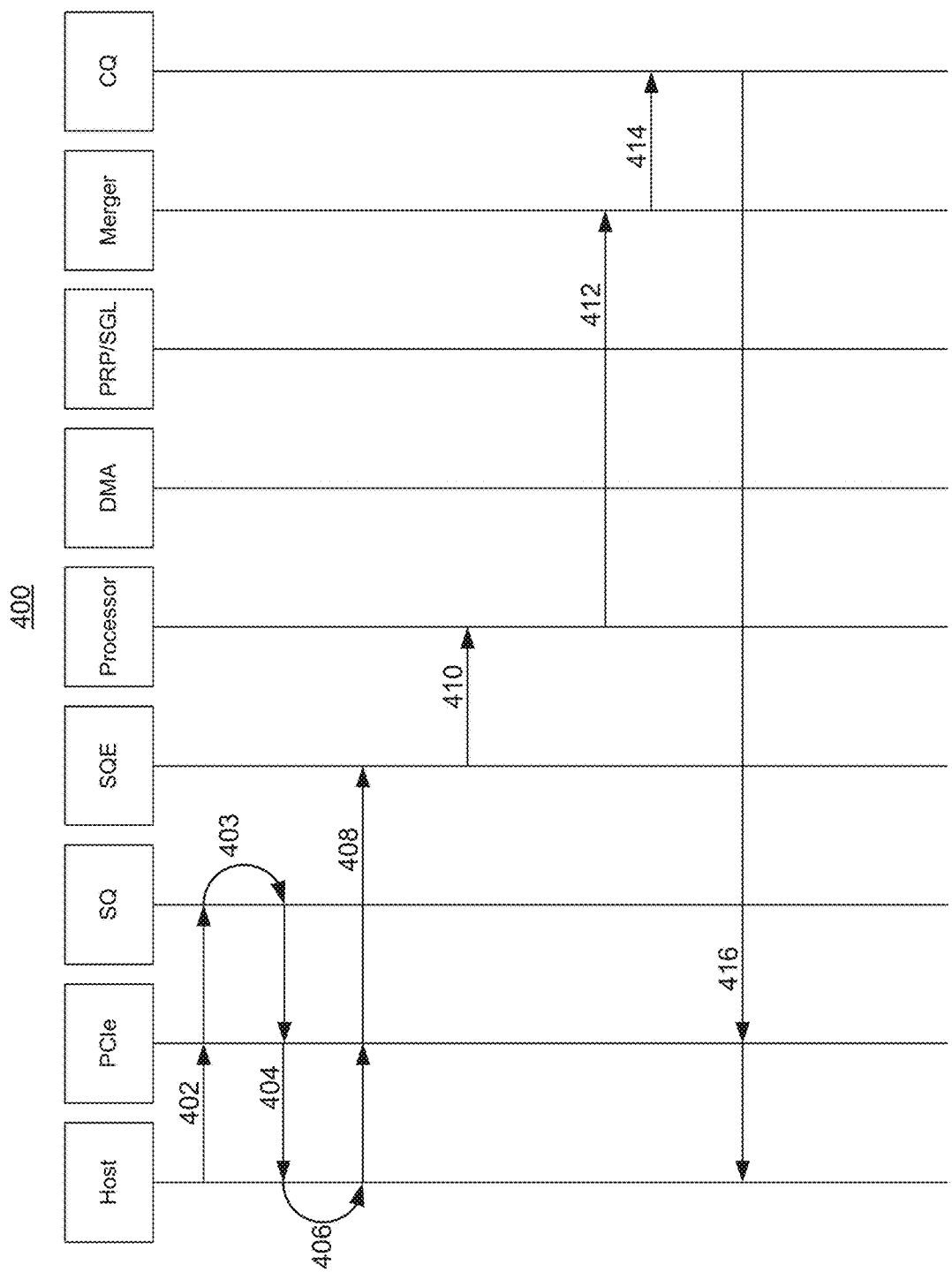
FIG. 4 is a ladder diagram illustrating a method for processing a system command at an SSD system/apparatus that includes a host machine and an SSD, according to one example embodiment.

FIG. 4 is a ladder diagram illustrating a method 400 for processing a system command at an SSD system/apparatus that includes a host machine and an SSD, according to one example embodiment. The SSD includes an NAND memory and an SSD controller. The method 400 may be performed at, for example, the SSD system of FIG. 1. At 402, the host machine sends a doorbell message to the SQ block of the SSD controller via the PCIe interface. The doorbell message informs the SSD controller that a command is ready for the SSD controller to execute. At 403, the SQ block determines an SQ identifier according to an applicable protocol (e.g., NVMe protocol) for acquiring SQE content. At 404, the SQ block sends a request for the SQE content to the host machine via the PCIe interface. At 406, the host machine gets the SQE content based on the request. At 408, the host machine sends the SQE content to the SQE block of the SSD controller. At 410, the SQE block reads the SQE content and sends a system message including the SQE content to the processor. At 412, the processor sends to the merger block the result of processing the system message according to a protocol (e.g., ZNS protocol). At 414, the merger block determines that the result of processing the system message indicates a system command for managing the SSD and sends a CQ message to the CQ block. At 416, in response to receiving the CQ message, the CQ block sends CQE message indicative of completion of the system command to the host machine via the PCIe interface. The host machine records the CQE message in its buffer. In the illustrated embodiment, the ZNS protocol related commands are processed by the processor when the ZNS protocol is not implemented by hardware structures designed for the ZNS protocol.

Figure 5:
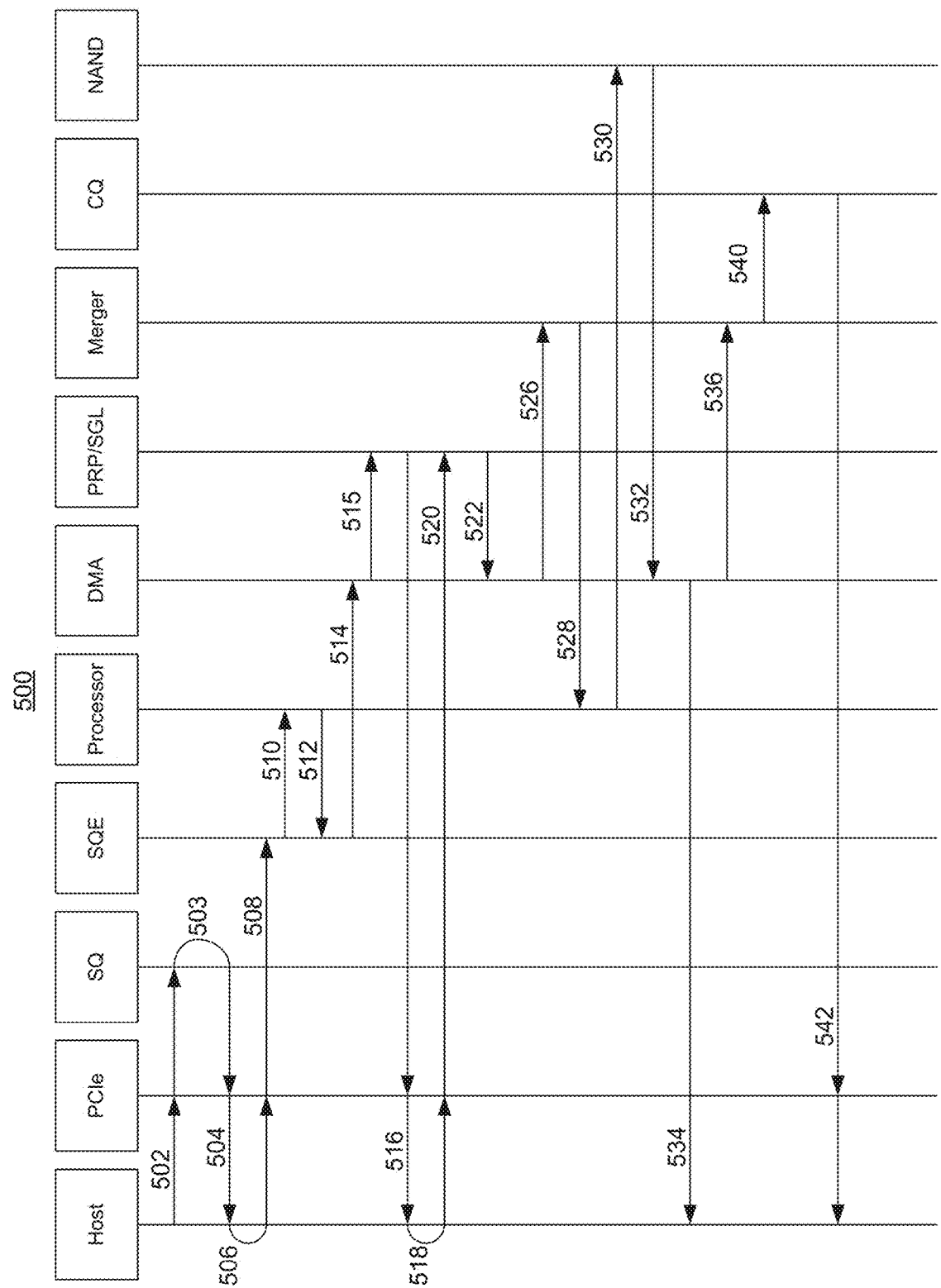
FIG. 5 is a ladder diagram illustrating a method for processing a read command at an SSD system/apparatus that includes a host machine and an SSD, according to one example embodiment.

FIG. 5 is a ladder diagram illustrating a method 500 for processing a read command at an SSD system/apparatus that includes a host machine and an SSD, according to one example embodiment. The SSD includes an NAND memory and an SSD controller. The method 500 may be performed at, for example, the SSD system of FIG. 1. At 502, the host machine sends a doorbell message to the SQ block of the SSD controller via the PCIe interface. The doorbell message informs the SSD controller that a command is ready for the SSD controller to execute. At 503, the SQ block determines an SQ identifier according to an applicable protocol (e.g., NVMe protocol) for acquiring SQE content. At 504, the SQ block sends a request for the SQE content to the host machine via the PCIe interface. At 506, the host machine gets the SQE content based on the request. At 508, the host machine sends the SQE content to the SQE block of the SSD controller. At 510, the SQE block reads the SQE content and sends a system message including the SQE content to the processor. At 512, the processor processes the system message to obtain the read command according to the ZNS protocol and returns the read command to the SQE block.

At 514, the SQE block sends the read command to the DMA block. At 515, based on the read command which indicates the data to be read, the DMA block sends a PRP/SGL message to the PRP/SGL block for the PRP/SGL block to perform address resolution with the host machine to the memory address of the host machine for storing the data.

At 516, the PRP/SGL block performs address resolution with the host machine to obtain the memory address of the host machine. At 518, the host machine obtains the address at the host buffer. At 520 the host machine returns the address at the host buffer to the PRP/SGL block. At 522, the PRP/SGL block obtains the host memory address, saves it to the local memory, and returns the local memory address to the DMA block.

At 526, the DMA block combines the PRP/SGL local memory address and the SQE key information including the read command, and sends it to the merge block. At 528, the merger block saves the read command locally and sends SQE key information to the processor. At 530, the processor send the read command to the NAND memory to obtain the data to be read. At 532, the NAND memory returns the data to the DMA block. In response to receiving the data, the DMA block at 534 forwards the data to the host machine and at 536 report the receipt to the merger block.

At 540, in response to receiving the report from the DMA block, the merger block sends a CQ message to the CQ block. At 542, in response to receiving the CQ message, the CQ block sends CQE message indicative of completion of the read command to the host machine via the PCIe interface. The host machine records the CQE message in its buffer.

The techniques disclosed herein provide an SSD system for parallel processing. It provides efficient write operation according to an emerging protocol (e.g., the ZNS protocol) where the emerging protocol is implemented by software and executed by the processor and the matured protocol (e.g., PCIe and NVMe protocols) is implemented with hardware and/or firmware. The techniques provide flexibility for the SSD system to adapt to the latest protocol updates for the emerging protocol without changing its hardware structures.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:
1. A solid state drive (SSD) comprising:
a NAND memory; and
an SSD controller coupled to the NAND memory, wherein the SSD controller comprises:
an interface coupled to a host machine;
a nonvolatile memory controller coupled to the interface; and
a processor coupled to the nonvolatile memory controller,
wherein the SSD controller is configured to:
receive, via the interface, a write command from the host machine;
process, by the nonvolatile memory controller, the write command by sending a submission queue

(SQ) identifier to the host machine for obtaining submission queue entry (SQE) content;

receive, by the nonvolatile memory controller, the SQE content from the host machine;

transmit, from the nonvolatile memory controller to the processor, a system message comprising the SQE content;

process, by the processor according to the ZNS Zoned Namespaces (ZNS) protocol, the system message;

transmit, by the nonvolatile memory controller to a Direct Memory Access DMA) block, the SQE content to enable the DMA block to obtain host data from the host machine;

obtain, by the nonvolatile memory controller via the interface, the host data for storage from the host machine; and in response to receiving both the host data and a processing result of the system message, write the host data to the NAND memory based on the processing result of the system message, and send a message indicative of completion of the write command to the host machine, wherein the (1) transmitting the system message from the nonvolatile memory controller to the processor and processing the system message by the processor according to the ZNS protocol and (2) transmitting the SQE content from the nonvolatile memory controller to the DMA block and obtaining the host data by the nonvolatile memory controller from the host machine are executed in parallel.

2. The SSD of claim 1, wherein the interface is operated according to Peripheral Component Interconnect Express (PCIe) protocol.

3. The SSD of claim 2, wherein the nonvolatile memory controller is operated according to nonvolatile memory express (NVMe) protocol.

4. The SSD of claim 1, wherein the nonvolatile memory controller comprises a complete queue (CQ) block and a merger block, wherein the merger block is configured to send a CQ message to the CQ block after receiving both the result of processing the system message from the processor and the host data from the host machine.

5. The SSD of claim 4, wherein the CQ block is configured to, in response to receiving the CQ message from the merger block, send a complete queue entry (CQE) message to the host machine indicative of completion of the write command.

6. The SSD of claim 1, wherein the write command is a doorbell message.

7. An apparatus comprising a host machine and a solid state drive (SSD), wherein the SSD comprises:

a NAND memory; and an SSD controller coupled to the NAND memory, wherein the SSD controller comprises:

an interface coupled to a host machine;

a nonvolatile memory controller coupled to the interface; and a processor coupled to the nonvolatile memory controller, wherein the SSD controller is configured to:

receive, via the interface, a write command from the host machine;

process, by the nonvolatile memory controller, the write command by sending a submission queue (SQ) identifier to the host machine for obtaining submission queue entry (SQE) content;

receive, by the nonvolatile memory controller, the SQE content from the host machine;

transmit, from the nonvolatile memory controller to the processor, a system message comprising the SQE content;

process, by the processor according to Zoned Namespaces (ZNS) protocol, the system message;

transmit, by the nonvolatile memory controller to a Direct Memory Access (DMA) block, the SQE content to enable the DMA block to obtain host data from the host machine;

obtain, by the nonvolatile memory controller via the interface, the host data for storage from the host machine;

in response to receiving both the host data and a processing result of the system message, write the host data to the NAND memory based on the processing result of the system message, and send a message indicative of completion of the write command to the host machine; and wherein the (1) transmitting the system message from the nonvolatile memory controller to the processor and processing the system message by the processor according to the ZNS protocol and (2) transmitting the SQE content from the nonvolatile memory controller to the DMA block and obtaining the host data by the nonvolatile memory controller from the host machine are executed in parallel.

8. The apparatus of claim 7, wherein the interface is operated according to Peripheral Component Interconnect Express (PCIe) protocol.

9. The apparatus of claim 8, wherein the nonvolatile memory controller is operated according to nonvolatile memory express (NVMe) protocol.

10. The apparatus of claim 7, wherein the nonvolatile memory controller comprises a complete queue (CQ) block and a merger block, wherein the merger block is configured to send a CQ message to the CQ block after receiving both the result of processing the system message from the processor and the host data from the host machine.

11. The apparatus of claim 10, wherein the CQ block is configured to, in response to receiving the CQ message from the merger block, send a complete queue entry (CQE) message to the host machine indicative of completion of the write command.

12. The apparatus of claim 7, wherein the write command is a doorbell message.

13. A method of operating a solid state drive (SSD) that comprises a NAND memory and an SSD controller coupled to the NAND memory, wherein the SSD controller comprises an interface coupled to a host machine, a nonvolatile memory controller coupled to the interface, and a processor coupled to the nonvolatile memory controller, the method comprising:

receiving, via the interface, a write command from the host machine;

processing, by the nonvolatile memory controller, the write command by sending a submission queue (SQ) identifier to the host machine for obtaining submission queue entry (SQE) content;

receiving, by the nonvolatile memory controller, the SQE content from the host machine;

transmitting, from the nonvolatile memory controller to the processor, a system message the SQE content;

processing, by the processor according to Zoned Namespaces (ZNS) protocol, the system message;

transmitting, by the nonvolatile memory controller to a Direct Memory Access (DMA) block, the SQE content to enable the DMA block to obtain host data from the host machine obtaining, by the nonvolatile memory controller via the interface, the host data for storage from the host machine; and in response to receiving both the host data and a processing result of the system message, write the host data to the NAND memory based on the processing result of the system message, and send a message indicative of completion of the write command to the host machine, wherein the (1) transmitting the system message from the nonvolatile memory controller to the processor and processing the system message by the processor according to the ZNS protocol and (2) transmitting the SQE content from the nonvolatile memory controller to the DMA block and obtaining the host data by the nonvolatile memory controller from the host machine are executed in parallel.

14. The method of claim 13, wherein the interface is operated according to Peripheral Component Interconnect Express (PCIe) protocol.

15. The method of claim 14, wherein the nonvolatile memory controller is operated according to nonvolatile memory express (NVMe) protocol.

* * * * *